Jan. 22, 1946.  T. F. HAMILTON  2,393,370
DISPENSING DEVICE
Filed April 5, 1941  6 Sheets-Sheet 1
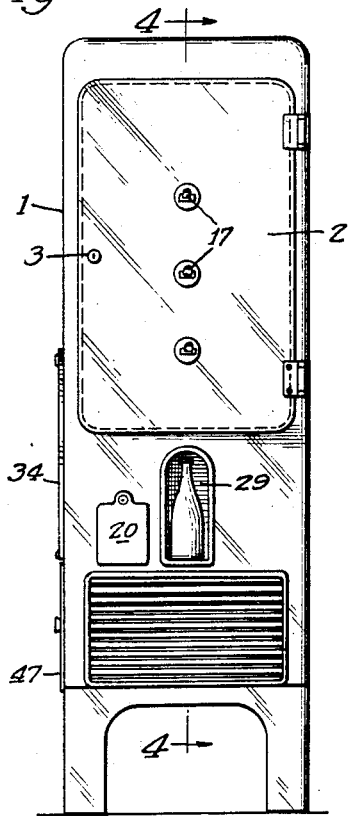
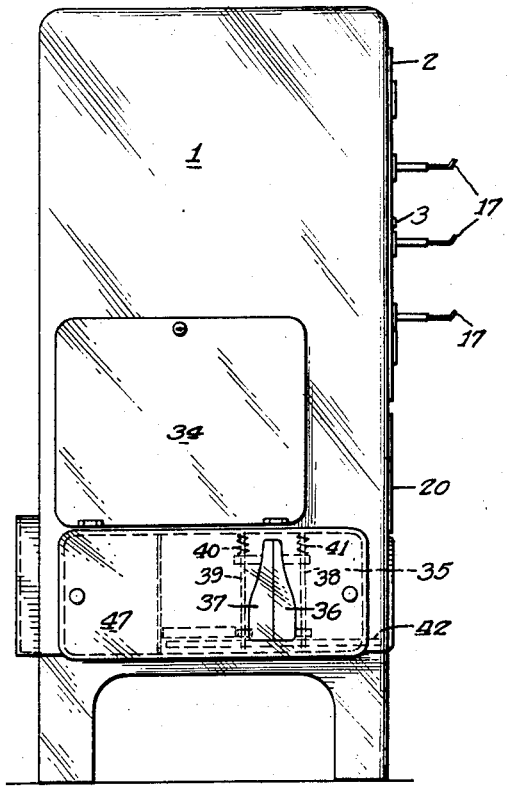
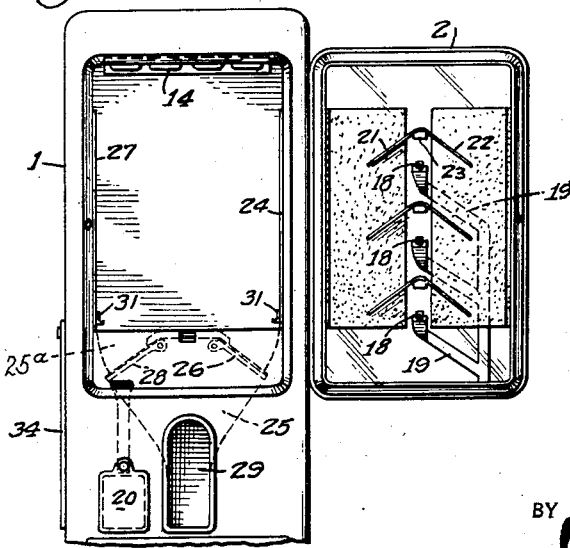
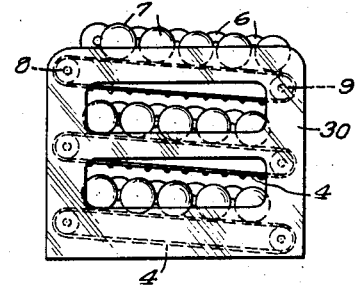
INVENTOR.
Thomas F. Hamilton
BY Parker & Carter ATTYS.

Jan. 22, 1946.     T. F. HAMILTON     2,393,370
DISPENSING DEVICE
Filed April 5, 1941     6 Sheets-Sheet 2
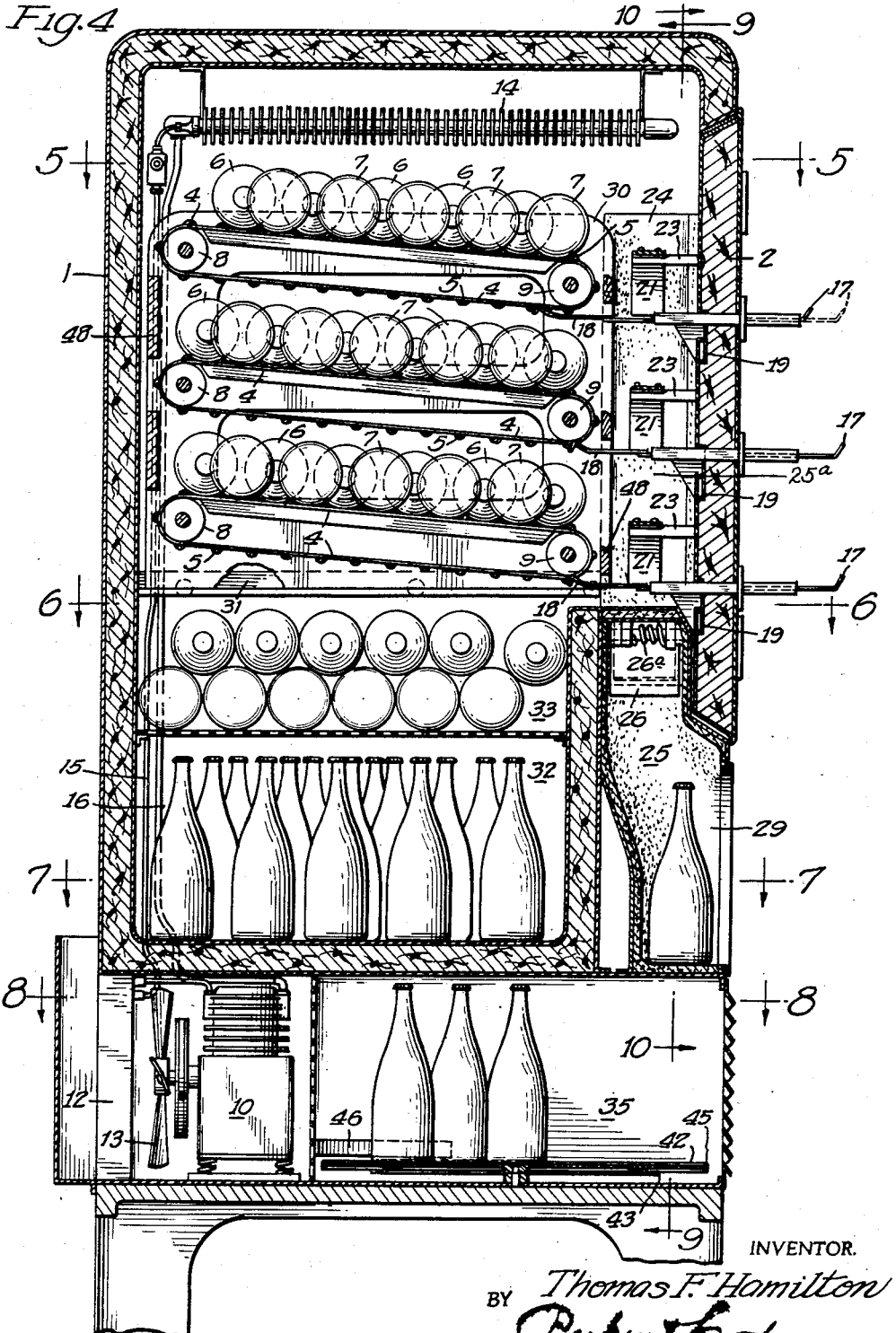
INVENTOR.
Thomas F. Hamilton
BY Parker & Carter ATTYS.

Jan. 22, 1946. T. F. HAMILTON 2,393,370
DISPENSING DEVICE
Filed April 5, 1941 6 Sheets-Sheet 3

INVENTOR.
Thomas F. Hamilton
BY Parker & Carter ATTYS.

Jan. 22, 1946.  T. F. HAMILTON  2,393,370
DISPENSING DEVICE
Filed April 5, 1941  6 Sheets-Sheet 4

INVENTOR.
Thomas F. Hamilton
BY Parker Carter
ATTYS.

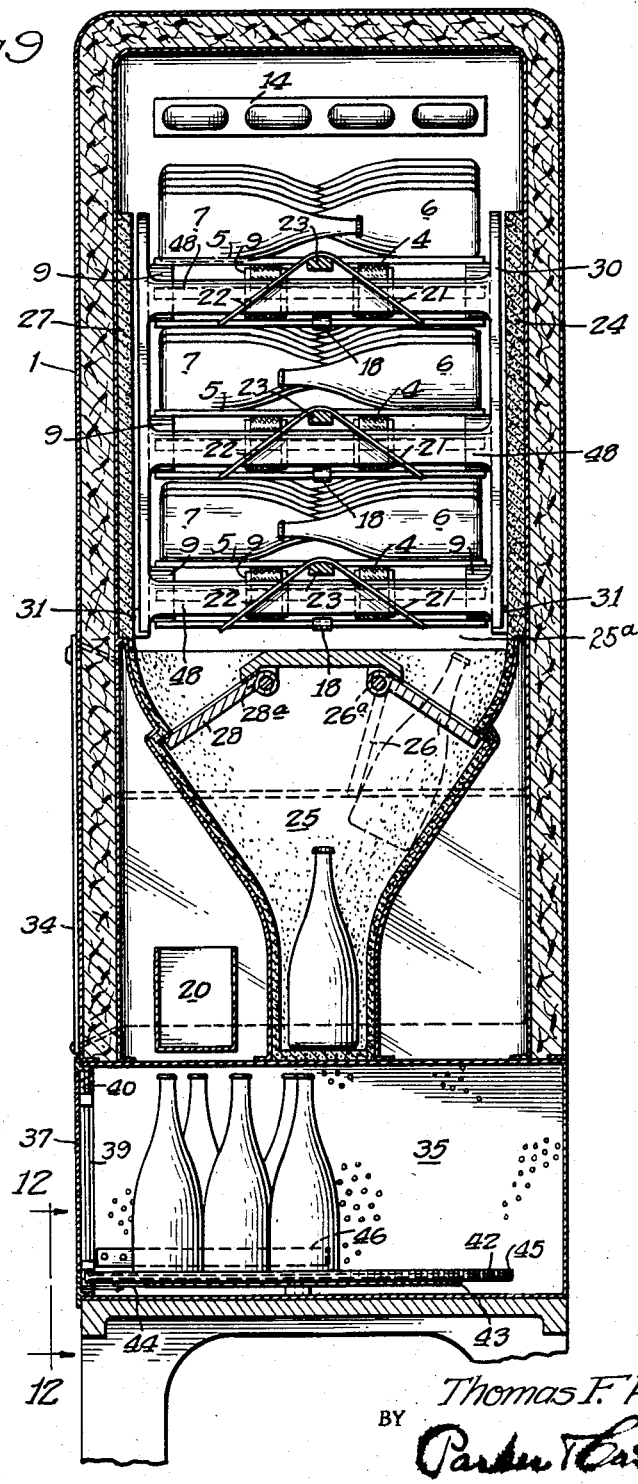

Jan. 22, 1946. T. F. HAMILTON 2,393,370
DISPENSING DEVICE
Filed April 5, 1941 6 Sheets-Sheet 6
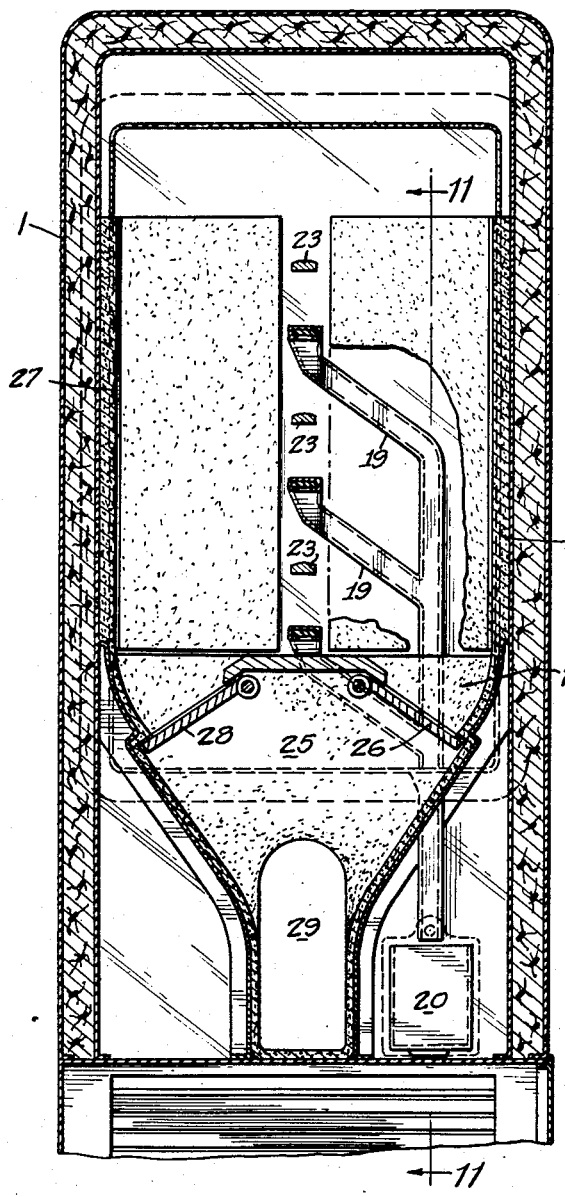
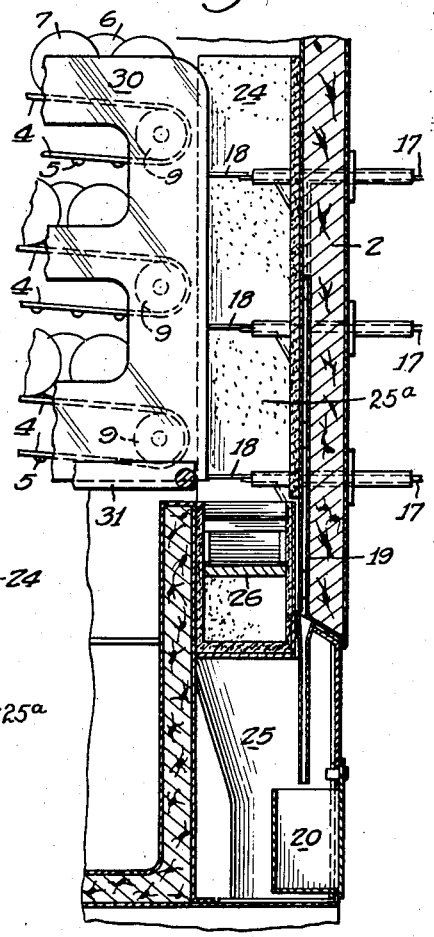
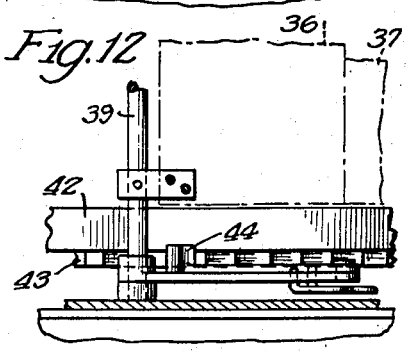
INVENTOR.
Thomas F. Hamilton
BY Parker T Carter ATTYS.

Patented Jan. 22, 1946

2,393,370

UNITED STATES PATENT OFFICE 2,393,370

DISPENSING DEVICE

Thomas F. Hamilton, Chicago, Ill.

Application April 5, 1941, Serial No. 387,045

7 Claims. (Cl. 312—96)

This invention relates to dispensing devices and has for its object to provide a new and improved device of this description.

One of the objects of this invention is to provide a dispensing device by means of which bottles of beverages of different kinds may be easily and efficiently stored and easily and quickly delivered to the user. The invention has as a further object to provide a dispensing device wherein the bottles are nested so that the ends lap and are moved to the delivery point while in this lapping position. The invention has as a further object to provide a dispensing device where the bottles are mounted in a lapping position on a conveyor and are delivered one at a time to the user.

The invention has as a further object to provide a dispensing device where the bottles are mounted in two rows substantially horizontally, in a lapping position on a conveyor, with means for delivering the bottles successively from the said rows. The invention has as a further object to provide a dispensing device wherein there is a positive gravity discharge for the bottles. The invention has as a further object to provide a dispensing device for dispensing beverages in bottles, provided with a pre-cooling chamber for bottles to be used for reloading purposes, and also an empty bottle chamber.

The invention has further objects which are more particularly pointed out in the accompanying description.

Referring now to the drawings,

Fig. 1 is a front view of one form of device embodying the invention;

Fig. 2 is a side view of the device shown in Fig. 1;

Fig. 3 is a view similar to Fig. 1, showing the door open and the bottle holder removed;

Fig. 3A is a view of one of the bottle holding devices;

Fig. 4 is an enlarged sectional view taken on line 4—4 of Fig. 1;

Fig. 9 is a sectional view taken on line 9—9 of Fig. 4;

Fig. 10 is a sectional view taken on line 10—10 of Fig. 4, with parts omitted, showing the coin chutes and receptacles;

Fig. 11 is a sectional view taken on line 11—11 of Fig. 10; and

Fig. 12 is a view with parts omitted, showing the means for rotating the support for the empty bottles.

Like numerals refer to like parts throughout the several figures.

Figure 5:
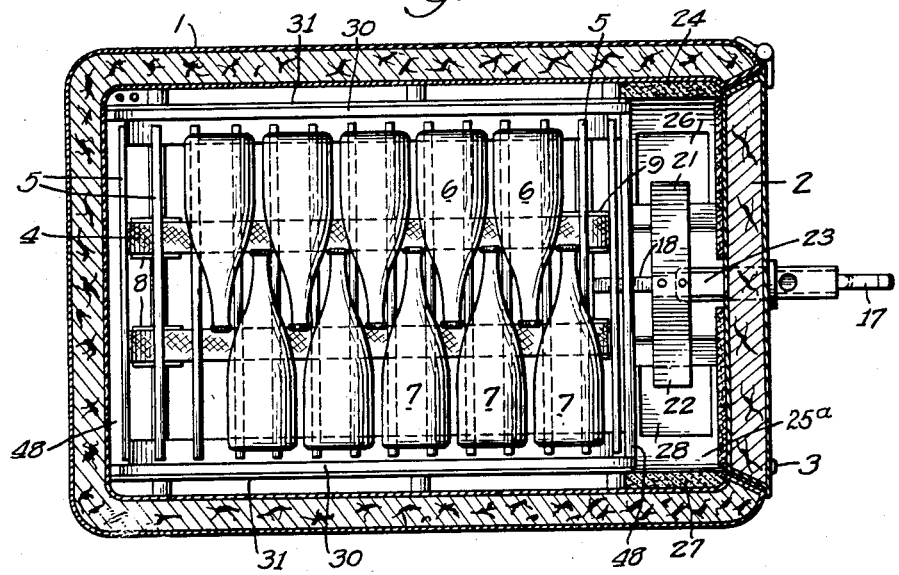
Fig. 5 is a sectional view taken on line 5—5 of Fig. 4.

Referring now to the drawings wherein I have illustrated one form of dispensing device for bottled beverages, there is a heat insulating cabinet or casing 1 in which the bottles are received. There is a hinged door 2 preferably at the front, through which the bottles are inserted and which is provided with a lock 3 to prevent access thereto except by authorized parties. Located within the casing are one or more bottle holding devices. The bottle holding devices comprise an endless belt or conveyor 4 which extends across the casing and which is provided with bottle holding members 5 which engage the bottles so as to hold them in position. The endless belts are preferably inclined downwardly toward the delivery end and these holding devices insure the proper holding of the bottles so as to keep them from crowding each other and so that only one bottle will be delivered at a time. I prefer to arrange these endless belts so that the bottles will be nested thereon, that is there will be two rows of bottles 6 and 7, which have their ends lapping, see Fig. 5. When this construction is used, I prefer to have the bottle holding members 5 extend across the endless belt so that they engage both rows of bottles. By this means one bottle holding member will engage the bottle of one row on one side and the bottle of the opposed row on the other side, as is clearly shown in Fig. 5. The endless belts extend around sprockets or pulleys 8 and 9 at opposite ends thereof.

Some suitable means is provided for cooling the interior of the casing so as to cool the beverage in the bottles. Any suitable refrigerating apparatus may be used. I have shown one of the usual forms of refrigerating apparatus comprising a compressor 10 operated by a motor 11. There is a condenser 12 and a fan 13. An evaporator 14 is located at the top of the casing and is connected by pipes 15 and 16 with the compressor and condenser in the usual manner.

When the bottles are dispensed by means of a coin operated apparatus, any suitable coin operated apparatus may be used for this purpose. This coin operated apparatus is preferably connected with the door 2. There will preferably be a coin operated device associated with each endless belt and it may consist of a member 17 accessible from outside the casing and which normally when grasped, can be moved back and forth without producing any result. When a coin is placed in the proper position, the member 17 is then connected with the belt actuating device 18 which engages some part associated with the endless belt and the belt is then moved a sufficient distance to release one of the bottles. I prefer to have this belt actuating device engage the bottle holding members 5 for the purpose of moving the endless belt. The coin, when the bottle is delivered, is released and moves down the coin chute 19 to the coin box 20, see Figs. 9 and 10.

When the bottles are nested the open ends or necks of the bottles overlap so that the open ends point in opposite directions, as shown, for example, in Figs. 5 and 9. Located in proximity to the discharge end of each of the endless belts are the bottle engaging members 21 and 22. These are preferably spring members and are supported by a support 23. I prefer to have the two bottle engaging members formed of a single piece. As the belt, for example the lowest belt, is moved, the end bottle, for example of row 6, drops off the belt, see Fig. 9, and the bottle engaging member 21 engages it and causes it to take an upright position, bottom down. There is a bottle guide 24 which engages the periphery of the bottle and the spring bottle engaging member 21 presses the bottle against this guide and acts as a brake to slow down its movement. The bottle then drops down into the bottle delivery compartment 25. This delivery compartment is part of the delivery chamber 25a and has a door 26 through which the bottle passes. This door is spring actuated, having a spring 26a to close it, and it also acts as a brake to slow up the bottle. The bottle is finally landed in an upright position, as shown in Fig. 9.

Figure 6:
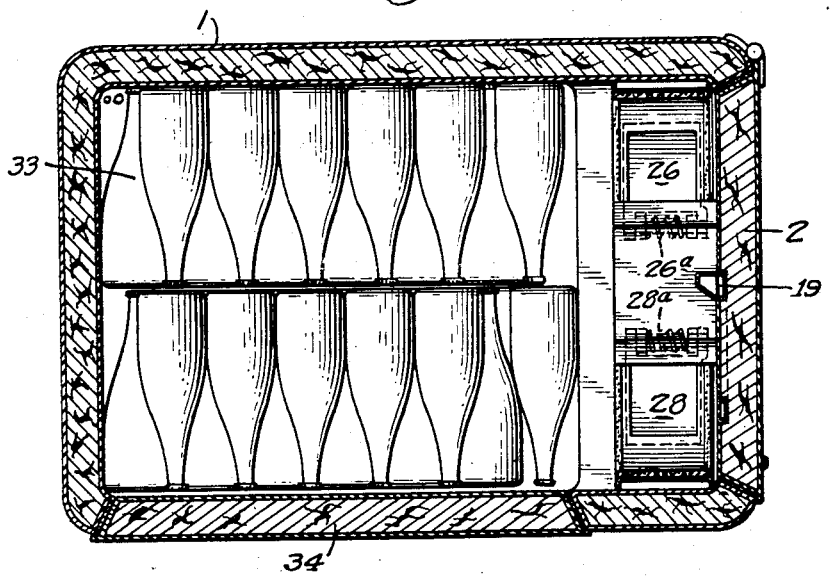
Fig. 6 is a sectional view taken on line 6—6 of Fig. 4.
Figure 7:
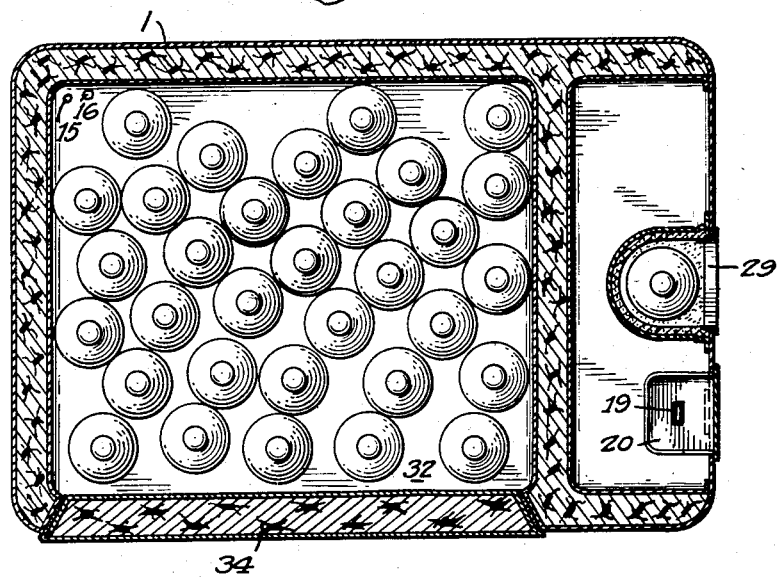
Fig. 7 is a sectional view taken on line 7—7 of Fig. 4.

At the next actuation of the lowest belt a bottle from row 7 is released and it is engaged by the bottle engaging member 22 and brought to an upright position in engagement with the guide 27 and it is then delivered through a spring actuated door 28 provided with a spring 28a, see Fig. 6, into the bottle delivery compartment 25 and takes an upright position at the end thereof.

When a bottle on any of the upper endless belts is released, the bottle engaging device 22 next to it engages it and moves it to an upright position and presses it against the associated guide and acts as a brake to slow up its movement. This bottle then successively engages the lower bottle engaging members so as to be maintained in contact with its associated guide and is finally delivered in an upright position in the bottle delivery compartment 25. This bottle delivery compartment 25 is provided with an opening 29 and the user simply reaches in and removes the bottle.

The endless belts may be mounted in a suitable frame, such, for example, as the frame 30. According to the invention several sets of endless belts are disposed one above the other in superposed relation and each set is operative independently of the other. There are suitable guides 31 on opposite sides of the casing, by means of which the frame carrying the container belts may be moved outwardly for the belts to be refilled or moved entirely outside the casing to be cleaned or repaired. This is very important in the event such a beverage as milk is being dispensed, for if one of the bottles should break or the beverage should spill out, it is absolutely essential to at once clean the cabinet.

By having a series of endless belts with the bottles of beverages, beverages of different flavors can be dispensed from the same cabinet. In this event, the name of the beverage would be placed opposite each coin operated device, so that the user can operate the proper one and get the desired beverage.

Figure 8:
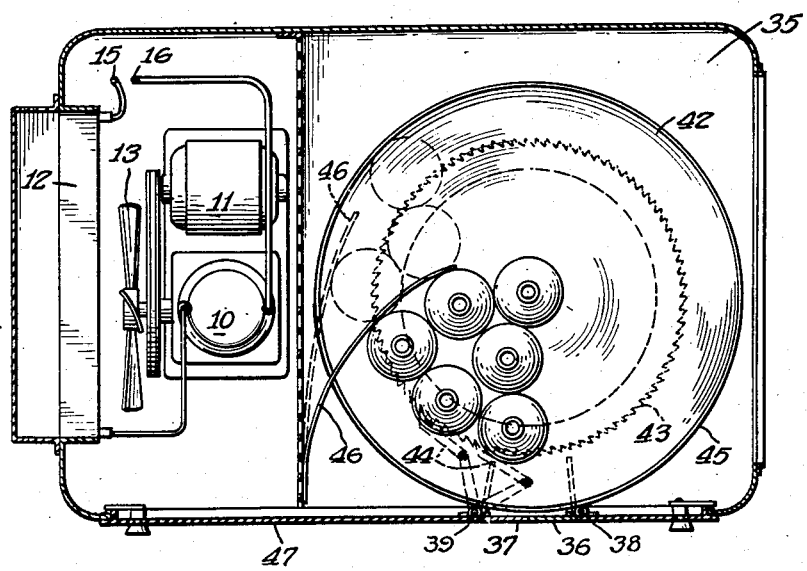
Fig. 8 is a sectional view taken on line 8—8 of Fig. 4.

I also prefer to provide means for storing full bottles in the cabinet so that as the bottles are removed and used, they can be easily replaced. For this purpose I provide a bottle storage chamber which is preferably divided into two sections 32 and 33, see Fig. 4. In the section 32 the bottles are shown as upright and in the section 33 they are shown as placed on their sides. There is a door 34 by means of which these bottles may be inserted in and removed from the storage chamber. I also prefer to provide an empty bottle chamber 35 for empty bottles. This empty bottle chamber may be provided with a double door made of two sections 36 and 37, see Figs. 2 and 8, which are hinged to the members 38 and 39, there being springs 40 and 41 which close the doors as soon as the bottle is pushed in. I prefer to have a rotatable support 42 upon which these empty bottles are placed. There is preferably means for moving this support each time a bottle is placed thereon so as to make room for the new bottle. This is accomplished by means of a toothed or ratchet member 43 which is engaged by a ratchet 44, moved each time the door is opened, see Figs. 8 and 12. There is a holding which keeps the bottles from falling off. There member 45 at the edge of the support 42 is a spring 46 which is fastened to a fixed part of the cabinet and which engages the empty bottles as they are placed in position to maintain them in proper position, see Fig. 8. There is a door 47 through which the empty bottles may be removed.

The storage chamber for the filled bottles is on the inside of the insulated portion of the cabinet so that these bottles are pre-cooled, thus permitting the cabinet to be filled with bottles having cold beverage therein which can be used for drinking purposes.

There are cross pieces 48 at intervals for connecting the side pieces of the frame 30 together. These cross pieces are preferably both at the front and the rear, see Figs. 4 and 9.

I claim:

1. A dispensing device for beverages in containers, comprising a casing, a movable support therein for supporting a number of filled containers in a substantially horizontal position, means for moving said support to successively discharge said containers therefrom, a container delivery chamber, and means for causing said containers to be moved to an upright position comprising a spring member located in the path of the containers, which successively engages the containers and causes them to be delivered in such upright position to said container delivery chamber.

2. A dispensing device for beverages in containers, comprising a casing, a movable support therein for supporting a number of filled containers in a substantially horizontal position, means for moving said support to successively discharge said containers therefrom, a container delivery chamber, means for causing said containers to be moved to an upright position comprising a spring member located in the path of the containers, which successively engages the containers and causes them to be delivered in such upright position to said container delivery chamber, and means for retarding the movement of said containers as they move to said container delivery chamber.

3. A dispensing device for beverages in containers, comprising a casing, a movable support for the containers located in said casing, said support arranged to contain two sets of containers with their ends lapping, means for alternately discharging from said support containers from said two sets of containers, a container delivery compartment, and means for successively guiding containers from said two sets of containers to said container delivery compartment to an upright position.

4. A bottle dispensing device, in combination, a casing including a front wall, a back wall and side walls, at least one bottle holding device in the casing extending from adjacent the front wall to the back wall, said bottle holding device having a slight inclination downwardly and said device providing a support for two parallel rows of bottles having their necks lapping in nested relation, means for effecting discharge of the bottles from the lower end of the bottle holding device in an alternate manner, whereby a bottle is delivered first from one of said parallel rows and then from the other, a container delivery compartment located at the discharge end of the bottle holding device, and means for causing said discharged bottles to be moved to an upright position comprising a spring member located in the path of the discharged bottles, which successively engages the bottles and causes them to be delivered in such upright position to said container delivery compartment.

5. A bottle dispensing device, in combination, a casing including a front wall, a back wall and side walls, at least one bottle holding device in the casing extending from adjacent the front wall to the back wall, said bottle holding device having a slight inclination downwardly and said device providing a support for two parallel rows of bottles having their necks lapping in nested relation, means for effecting discharge of the bottles from the lower end of the bottle holding device in an alternate manner, whereby a bottle is delivered first from one of said parallel rows and then from the other, a container delivery chamber extending vertically of the casing and terminating at its lower end in a delivery compartment, said chamber having location between a wall of the casing and said discharge end of the bottle holding device, and means for causing said discharged bottles to be delivered in an upright position to the delivery compartment comprising a spring member supported from said last named wall of the casing and having location in the path of the discharged bottles, said spring member successively engaging the bottles and causing them to be delivered in such upright position to said delivery compartment.

6. A bottle dispensing device, in combination, a container including a front wall, a back wall and side walls, a plurality of bottle holding devices in said casing in superposed relation and each extending from adjacent the front wall to the back wall, said bottle holding devices having a slight inclination downwardly toward the delivery end thereof and each said device providing a support for two parallel rows of bottles having their necks lapping in nested relation, means for effecting discharge of the bottles from the discharge end of each bottle holding device in an alternate manner, whereby a bottle is delivered first from one of said parallel rows thereof and then from the other, a container delivery chamber extending vertically of the casing between a wall of the same and said discharge ends of the bottle holding devices, said container delivery chamber being common to all said bottle holding devices and terminating at its lower end in a delivery compartment, and means for causing said discharged bottles to be delivered in an upright position to the delivery compartment, said means being located in the container delivery chamber in the path of the bottles discharged from the bottle holding devices, and said means successively engaging the bottles and causing them to be delivered in such upright position to the delivery compartment.

7. A bottle dispensing device, in combination, a casing including a front wall, a back wall and side walls, a bottle support in the casing extending from adjacent the front wall to the back wall and comprising an endless belt having transversely extending members for holding bottles, said support having a slight inclination downwardly toward the discharge end thereof and said endless belt retaining two parallel rows of bottles having their necks lapping in nested relation, means for moving said endless belt to effect discharge of the bottles therefrom in an alternate manner, whereby a bottle is delivered first from one of said parallel rows and then from the other, a container delivery chamber located at the discharge end of said endless belt, said chamber extending vertically of the casing and terminating at its lower end in a delivery compartment, and means for causing said discharged bottles to be delivered to said delivery compartment in an upright position, said means having location in the container delivery chamber in the path of the discharged bottles to thereby successively engage the bottles and cause them to be delivered in such upright position to the delivery compartment.

THOMAS F. HAMILTON.

Certificate of Correction

Patent No. 2,393,370.                                                                                      January 22, 1946.

THOMAS F. HAMILTON

It is hereby certified that errors appear in the printed specification of the above numbered patent requiring correction as follows: Page 1, second column, line 2, for "receptacles" read *receptacle*; page 2, second column, line 40, strike out "member 45 at the edge of the support 42" and insert the same after "holding" in line 38; and that the said Letters Patent should be read with these corrections therein that the same may conform to the record of the case in the Patent Office.

Signed and sealed this 21st day of May, A. D. 1946.

[SEAL]

LESLIE FRAZER,
*First Assistant Commissioner of Patents.*